United States Patent [19]

Kaiser et al.

[11] 4,391,972
[45] Jul. 5, 1983

[54] CONTINUOUS REMOVAL OF RESIDUAL HYDROCARBONS FROM POLYOLEFINS

[75] Inventors: Karl Kaiser, Brühl; Alexander Ohorodnik, Erftstadt, both of Fed. Rep. of Germany

[73] Assignee: Hoechst Aktiengesellschaft, Fed. Rep. of Germany

[21] Appl. No.: 250,387

[22] Filed: Apr. 2, 1981

Related U.S. Application Data

[63] Continuation of Ser. No. 950,563, Oct. 12, 1978, abandoned.

[30] Foreign Application Priority Data

Oct. 19, 1977 [DE] Fed. Rep. of Germany ....... 2746909

[51] Int. Cl.³ .............................................. C08F 6/10
[52] U.S. Cl. ................................... 528/499; 422/225; 528/500
[58] Field of Search .............................. 528/500, 499

[56] References Cited

U.S. PATENT DOCUMENTS

| | | | |
|---|---|---|---|
| 3,000,871 | 9/1961 | Engel | 528/486 |
| 3,071,566 | 1/1963 | C assar | 528/486 |
| 3,547,865 | 12/1970 | Hoch | 528/486 |
| 3,583,967 | 6/1971 | Hattori | 528/486 |
| 3,959,243 | 5/1976 | Mattioli | 526/494 |
| 4,171,427 | 10/1979 | Ohorodnik | 528/500 |

Primary Examiner—C. A. Henderson
Attorney, Agent, or Firm—Connolly and Hutz

[57] ABSTRACT

Polyolefins which are made by subjecting α-olefins to catalytic polymerization are freed from residual liquid hydrocarbons by means of steam and water. To this end, the invention provides:

(a) for the hydrocarbon-containing polyolefin to be introduced into an aqueous emulsifier-containing emulsion and for the resulting mixture to be stirred so as to be converted to a homogeneous dispersion;

(b) for the dispersion to be introduced into the upper portion of a column with at least 5 sieve plates therein and contacted countercurrently with steam of about 100° to 120° C., the individual plates provided in the column having a free cross-sectional area which increases continuously from the lowermost to uppermost plate by about 3% up to 90% of the plate surface area, and being spaced apart from each other at approximately the same ratio from below to above; and (c) for the aqueous polyolefin dispersion free from hydrocarbons to be removed through the base portion of the column and for the polyolefin to be separated from the water.

9 Claims, 1 Drawing Figure

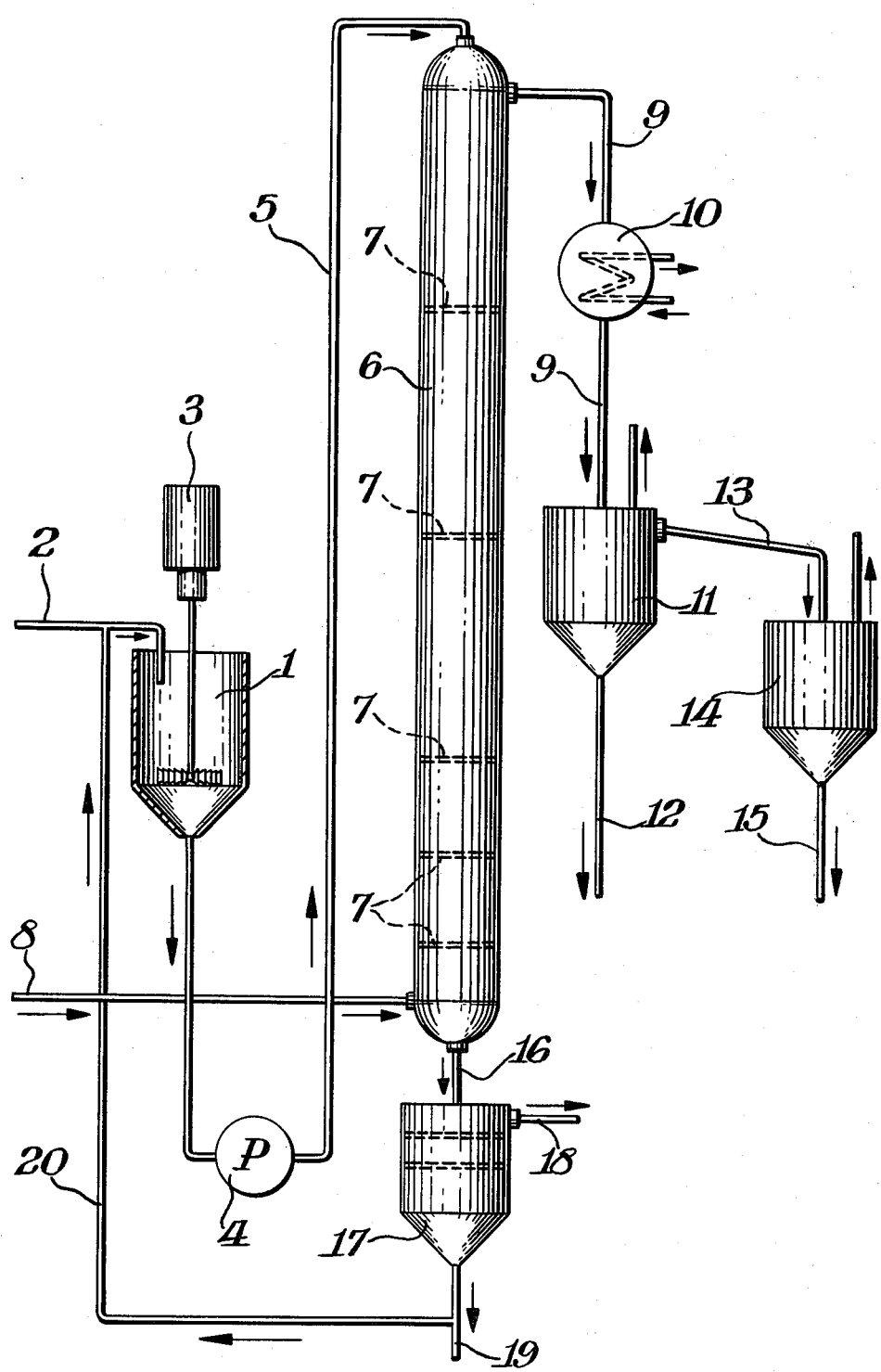

CONTINUOUS REMOVAL OF RESIDUAL HYDROCARBONS FROM POLYOLEFINS

CROSS REFERENCE TO RELATED APPLICATION

This application is a continuation of now abandoned application Ser. No. 950,563 filed Oct. 12, 1978.

BACKGROUND OF THE INVENTION

1. Field of the Invention

This invention relates to a process for continuously freeing polyolefins from residual hydrocarbons.

2. Description of the Prior Art

It is known that α-olefins or mixtures thereof can be polymerized by the Zeigler low pressure process with the aid of catalysts, which contain compounds of the elements belonging to subgroups IV to VI of the periodic system in combination with organometal compounds of the elements belonging to groups I to III of the periodic system, in saturated liquid $C_6$-$C_{11}$ hydrocarbons or suitable mixtures thereof, e.g. gasoline. During the work-up of the resulting polymers, the polyolefins which are suspended in the gasoline are separated from the dispersant by filtration with the use of a filter press. The polyolefins which are moist with gasoline can then be freed in various manner from adhering dispersant, e.g. by directly drying them in a contact drier or with the aid of hot air or an inert gas or by intensive steam distillation (cf. German Patent Specification "Auslegeschrift" 1 089 547).

Experience has shown that it is technically good practice to disperse gasoline-containing polymers in water and separate the gasoline from the aqueous phase by distillation with agitation, in the form of an azeotropic mixture with water. This method is not fully satisfactory, however, as considerable energy is required to be used for the distillative removal of residual gasoline. In addition to this, the distillative treatment gives rise to the formation of widely different azeotropic gasoline/water-mixtures, which call for the use of specifically designed distilling columns of appropriate separating efficiency.

A further process for removing monomers from an aqueous dispersion of a polymer containing at least 50 weight% of polymerized vinyl chloride has been described in German Patent Specification "Offenlegungsschrift" 2 521 780, wherein the dispersion is introduced into the upper portion of a sieve plate column and contacted countercurrently therein over a period of about 10 seconds to 20 minutes with steam of about 100° to 150° C. under a pressure of about 600 to 1200 mm Hg. Next, the polymer dispersion is removed through the base portion of the column, while a vapor mixture which escapes overhead is subjected to stagewise condensation so as to recover an aqueous phase and the monomers.

The process just described is not suitable for use in the removal of residual hydrocarbons from polyolefins, for the following reasons:

As compared with polyolefins, polyvinyl chloride has a density of more than 1.4 i.e. a density higher than that of water. In other words, an aqueous polyvinyl chloride dispersion which is introduced into the upper portion of a column will naturally travel downwardly, countercurrently to steam which ascends therein. This flow behaviour of polyvinyl chloride is in contrast with that of polyolefins which are specifically less dense than water. They float on the water surface rather than to travel downwardly in a column. It is also noted that the process described in German Patent Specification "Offenlegungsschrift" 2 521 780 is used for the removal of vinyl chloride which is gaseous under standard conditions, whereas the residual hydrocarbons which are to be removed from polyolefins have a boiling range of 60° to 190° C. and are accordingly in the liquid state. It should also be borne in mind that an aqueous polyvinyl chloride dispersion contains vinyl chloride in proportions of some ppm (ppm stands for parts per million) which do not substantially affect the nature of the dispersion. In contrast with this, the polyolefin dispersions which are to be treated in accordance with this invention contains considerably more significant proportions of undesirable materials which may (a) seriously affect the interfacial activity and are (b) liable to form azeotropes with the dispersant. Needless to say therefore the removal of gasoline raises a problem in respect of diffusion and entails additional difficulties which arise during the distillation, e.g. the deposition of solid matter or formation of foam.

SUMMARY OF THE INVENTION

In accordance with our present invention we have now unexpectedly found that the difficulties which have heretofore been encountered upon the distillative removal of residual hydro-carbons from an aqueous polyolefin suspension can be obviated. To this end, our invention provides for the surface tension of the aqueous phase in the dispersion to be reduced and for the distillative treatment to be effected under certain conditions.

The present invention relates more particularly to a process, wherein polyolefins which are made by subjecting α-olefins to catalytic polymerization in contact with standard catalyst mixtures of heavy metal compounds and organometal compounds, and contain about 10 to 50 weight% of saturated liquid residual hydrocarbons with at least 5 carbon atoms in the molecule, are freed from those residual hydrocarbons by means of steam and water, which comprises:

(a) introducing the hydrocarbon-containing polyolefin into an aqueous emulsifier-containing emulsion having a surface tension at 20° C., with respect to air, of about 50 to 68 dynes/cm; stirring the resulting mixture and converting it to a homogeneous dispersion; the aqueous dispersion containing about 10 to 40 weight% of the polyolefin;

(b) introducing the dispersion into the upper portion of a column with at least 5 sieve plates therein; contacting it countercurrently with steam of about 100° to 120° C., the individual plates provided in the column having a free cross-sectional area which increases continuously from the lowermost to uppermost plate by about 3% up to 90% of the plate surface area, and being spaced apart from each other at approximately the same ratio from below to above; and (c) removing, through the base portion of the column, an aqueous polyolefin dispersion free from hydrocarbons and separating the polyolefin from the water; and distilling off overhead a hydrocarbon/water-azeotrope or azeotropic mixture, condensing the azeotrope or azeotropic mixture in a condenser and separating it into its components in a separator downstream of the condenser.

BRIEF DESCRIPTION OF THE DRAWING

The drawing is a schematic illustration of an apparatus suitable for carrying out the process of this invention.

DETAILED DESCRIPTION

The residual hydrocarbons which are to be removed in accordance with this invention from polyolefins, e.g. polyethylene or polypropylene, generally contain 6 to 11 carbon atoms and are contained in the polyolefin in a proportion of 20 to 50 weight%. The residual hydrocarbons concerned comprise more specifically hexane and the residual hydrocarbon mixtures comprise gasoline with a boiling range of about 60° to 190° C.

It is more particularly advantageous to supply the upper portion of the sieve plate column with an optionally preheated aqueous polyolefin dispersion and contact the latter countercurrently with steam of 90° to 120° C. under a pressure of 700 to 1600 millibars. It is also good practice to use an aqueous emulsifier-containing dispersion which has a surface tension at 20° C., with respect to air, of 61 to 68 dynes/cm in order to prevent the dispersion from foaming inside the column. One of the useful emulsifiers is e.g. stearic acid ethoxylated with 70 mols of ethylene oxide.

A typical sieve plate column suitable for use in carrying out the present process may comprise e.g. 5 to 20 sieve plates with or without discharge weirs, the plates being arranged so as to be spaced apart from each other at separations which increase from below to above, the two uppermost plates being spaced apart from one another at a separation which is 10 times the separation between the two lowermost plates. Needless to say it is preferable to use a sieve plate provided with discharge weirs which has an improved load capacity.

A typical and proven embodiment of the present process comprises introducing about 30 to 50 l/h of the aqueous polyolefin dispersion into the upper portion of a column provided with 5 sieve plates without overflow, the individual plates having a free cross-sectional area equal to 5%, 10%, 20%, 60% and 70% respectively, of the plate surface area and being spaced apart from below to above at separations equal to 5%, 15%, 30% and 50% respectively, based on the overall length of the column. In order to ensure reliable distillation, the column head portion should preferably be maintained at a temperature which is above the boiling point of the hydrocarbon/water-azeotrope to be separated.

It was not easy to provide a solution for the problem underlying the present invention, for the following reasons:

To comply with the operating conditions in a distilling column, it is necessary for the dispersion to have certain properties which, however, may be seriously affected by (a) the need to use an emulsifier for dispersing the polyolefin in water and (b) the gasoline concentration which gradually varies from plate to plate during the distillation. In those cases in which a water/gasoline/polyolefin-dispersion is distillatively separated in a standard sieve plate column, in which the individual sieve plates have equal free cross-sectional areas and are arranged at equal separations, a dispersion foam is liable to form and accumulate in the upper portion of the column, under the distillation conditions. In other words, the foam which does not travel downwardly to the column base portion is ultimately removed overhead. A further complication resides in the fact that the polyolefin dispersion portions retained on the various plates have specific densities which are irregularly affected by the gasoline concentration, emulsifier quantity, and flow velocity of the dispersion through the perforations in the respective sieve plate. These are factors which vary from plate to plate so that it is extremely difficult by the use of conventional means simultaneously to operate all plates under stable equilibrium conditions which would permit the gasoline to be quantitatively distilled off overhead in the form of an azeotrope with water, and gasoline-free polyolefin to be removed through the column base portion.

The present process which can be carried out continuously enables energy savings to be effected and compares favorably in these respects with the prior art methods, wherein polyolefins are freed from residual hydrocarbons by steam distillation.

A typical and exemplary embodiment of the present process, which is naturally not limited thereto, will now be described with reference to the accompanying drawing.

A polyolefin containing residual hydrocarbons is introduced via a conduit (2) into an aqueous emulsifier-containing solution placed in a stirring vessel (1), and the resulting dispersion is homogenized by means of a stirrer (3). With the aid of a pump (4) and a conduit (5) the homogenized dispersion is delivered from the stirring vessel (1) to the upper portion of a distilling column (6) provided with a plurality of sieve plates (7), which are arranged so as to be spaced apart at different separations. The dispersion which travels downwardly in the column (6) is contacted countercurrently with hot steam. The steam is introduced into the column (6) through a conduit (8) opening thereinto below the lowermost sieve plate therein. An azeotropic mixture of residual hydrocarbons and water, which is formed in the column (6), is removed overhead through a conduit (9), condensed in a condenser (10) and separated into two layers in a separator (11). The lower water layer is removed through a conduit (12) and the upper layer of residual hydrocarbons is delivered through a conduit (13) to a receiver (14), from which the hydrocarbons can be removed through a conduit (15). Two further conduits (21) and (22) are vent pipes. The purified polyolefin is taken from the base portion of the column (6) and delivered through the conduit (16) to a separator (17), in which two layers commence forming. The upper polyolefin layer is taken from the separator (17) through a conduit (18), whilst the lower aqueous emulsifier-containing layer is either removed through a conduit (19) or recycled to the stirring vessel (1), through a conduit (20).

EXAMPLE 1

Polypropylene which contained about 40 weight% of gasoline with a boiling range of 140° to 190° C. was freed therefrom. To this end, an aqueous solution of 80° C. was prepared which contained 50 ppm of an emulsifier and had a surface tension at 20° C., with respect to air, of 65 dynes/cm. Next, the gasoline-containing polypropylene was dispersed therein and homogenized by stirring. The emulsifier was stearic acid ethoxylated with 70 mols of ethylene oxide. The homogenized dispersion contained 25 weight% of solid matter, 8.5 weight% of residual gasoline and 66.5 weight% of water. In order to effect energy savings, the dispersion was prepared from preheated emulsifier-containing water, which came from the separator (17) and in which the required emulsifier concentration was re-established by the addition of fresh emulsifier, if necessary. The surface tension of the aqueous emulsifier-containing solution was controlled in each particular case, prior to the distillation.

40 to 65 l/h of the aqueous emulsifier-containing polypropylene dispersion was introduced into the upper portion of the sieve plate column (6) and contacted countercurrently therein with steam of 102° C. The column head was maintained at a temperature of 99° C. to 101° C. and the lowermost sieve plate in the column was maintained under a pressure of 1020 millibars. The sieve plate column (6) was 2.2 m high and 10 cm wide. It was provided with altogether 5 sieve plates which were spaced from each other at the following separations, from below to above:

10 cm between the two lowermost plates,
20 cm between the 2nd and 3rd plates,
40 cm between the 3rd and 4th plates, and
70 cm between the 4th and 5th plates, and
80 cm was the free space left above the 5th plate.

The individual plates were more specifically designed to provide a free cross-sectional area of 5% for the lowermost plate,
10% for the 2nd plate,
20% for the 3rd plate,
60% for the 4th plate, and
70% for the 5th plate, based on the plates' surface area.

The aqueous polypropylene dispersion which was free from gasoline was taken from the base portion of the column (6) and separated in the separator (17). The gasoline/water-azeotrope which escaped overhead was condensed in the condenser (10), collected and separated in the separator (11).

EXAMPLE 2

The procedure was as described in Example 1, but the individual plates, which were provided with a run-off weir, were modified to provide a free cross-sectional area of 4% for the lowermost plate,
4% for the 2nd plate,
8% for the 3rd plate,
8% for the 4th plate, and
12% for the 5th plate.

Under these modified distillation conditions, it was possible reliably to vary, within the range 10 to 60 l/h, the throughput of the hydrocarbon-containing dispersion without any adverse effect on the separating efficiency.

EXAMPLE 3

The procedure was as described in Example 2, but the column was supplied with a dispersion composed of 25 weight% of polyethylene,
8.5 weight% of hexane, and
66.5 weight% of water.

The azeotropic mixture removed overhead had a boiling point of 62° C. Hexane and polyethylene were found to have been completely removed.

We claim:

1. In a process for freeing polyolefins, selected from the group consisting of polyethylene and polypropylene made by catalytic polymerization of alpha-olefins in a hydrocarbon solvent having 6–11 carbon atoms and containing about 10 to 50 weight % residual hydrocarbons, from said residual hydrocarbons by mixing the hydrocarbon-containing polyolefin with water, agitating the mixture so as to convert it into a homogeneous dispersion containing 10 to 40 weight % of the polyolefin, contacting said dispersion countercurrently with steam, removing an aqueous polyolefin dispersion free from said hydrocarbons and separating the polyolefin from the water, the improvement which comprises:

(a) using surfactant-containing water having a surface tension of 50 to 68 dynes/cm., with respect to air, measured at 20° C. with said surfactant being ethoxylated stearic acid;

(b) subsequently introducing the homogeneous dispersion into the upper portion of a column with at least 5 sieve plates therein for contacting it with the steam, said sieve plates having a free cross-sectional area increasing continuously from the lowermost to uppermost plate by about 3% up to 90% of the plate surface area and being arranged so as to be spaced from each other as intervals increasing from the lowermost to the uppermost plate, the interval between the two uppermost plates being 10 times the interval between the two lowermost plates; and (c) removing the aqueous polyolefin dispersion free from said hydrocarbons through said column's base portion.

2. The process as claimed in claim 1, wherein the residual hydrocarbons contain 6 to 11 atoms.

3. The process as claimed in claim 1, wherein the residual hydrocarbons comprise hexane or gasoline.

4. The process as claimed in claim 1, wherein the surfactant-containing water has a surface tension of 61 to 68 dynes/cm, with respect to air, measured at 20° C.

5. The process as claimed in claim 1, wherein the polyolefin contains 20 to 50 weight % of residual hydrocarbons.

6. The process as claimed in claim 1, wherein the homogeneous dispersion is introduced into the upper portion of a column provided with 5 sieve plates without overflow, the individual plates having a free cross-sectional area equal to 5%, 10%, 20%, 60% and 70%, respectively, of the plate surface area and being spaced apart from below to above at intervals equal to 5%, 15%, 30% and 50%, respectively, based on the overall length of the column.

7. The process as claimed in claim 1, wherein a temperature higher than the boiling point of the hydrocarbon/water-azeotrope to be separated is maintained near the head of the column.

8. The process as claimed in claim 1 wherein about 30 to 50 l/h of dispersion is introduced into the upper portion of the column.

9. The process as claimed in claim 1, wherein the aqueous polyolefin dispersion is contacted countercurrently with steam of 90° to 120° C. under a pressure of 700 to 1600 millibars.